(12) United States Patent
Yamagishi et al.

(10) Patent No.: US 9,735,714 B2
(45) Date of Patent: Aug. 15, 2017

(54) MOTOR CONTROLLER, SHEET CONVEYING DEVICE, AND IMAGE FORMING APPARATUS

(71) Applicant: KYOCERA Document Solutions Inc., Osaka-shi, Osaka (JP)

(72) Inventors: Yuki Yamagishi, Osaka (JP); Kenichi Onishi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/116,954

(22) PCT Filed: Jan. 19, 2016

(86) PCT No.: PCT/JP2016/051406
§ 371 (c)(1),
(2) Date: Aug. 5, 2016

(87) PCT Pub. No.: WO2016/117542
PCT Pub. Date: Jul. 28, 2016

(65) Prior Publication Data
US 2017/0170754 A1  Jun. 15, 2017

(30) Foreign Application Priority Data
Jan. 21, 2015  (JP) .................. 2015-009727

(51) Int. Cl.
*H02P 1/52* (2006.01)
*G03G 15/00* (2006.01)
(Continued)

(52) U.S. Cl.
CPC .............. *H02P 1/52* (2013.01); *B65H 5/062* (2013.01); *B65H 7/00* (2013.01); *G03G 15/6529* (2013.01);
(Continued)

(58) Field of Classification Search
CPC .. B65H 7/00; B65H 2557/23; B65H 2557/33; H02P 1/52; G03G 15/6529
See application file for complete search history.

(56) References Cited

U.S. PATENT DOCUMENTS 6,040,674 A  3/2000 Nishida et al.
2004/0245953 A1  12/2004 Peterson
(Continued)

FOREIGN PATENT DOCUMENTS

JP  2000245192 A  9/2000
JP  2008259321 A  10/2008
JP  2013099056 A  5/2013

OTHER PUBLICATIONS

ISA Japan Patent Office, International Search Report Issued in Application No. PCT/JP2016/051406, Mar. 15, 2016, WIPO, 4 pages.

*Primary Examiner* — Patrick Cicchino
(74) *Attorney, Agent, or Firm* — Alleman Hall Creasman & Tuttle LLP

(57) ABSTRACT

A motor controller (58) according to the present invention includes a pulse width detection portion (595), a speed control portion (591), a pulse width storage portion (596), a same pulse detection portion (597), and a stop processing portion (598). The pulse width detection portion detects the pulse widths of pulses included in the pulse signal. The speed control portion performs: an acceleration control of the drive motor; and a deceleration control of the drive motor. The same pulse detection portion detects, from among the pulses included in the pulse signal inputted during the deceleration control, a pulse in which the pulse width detected by the pulse width detection portion is the same pulse width as the pulse width of an earliest pulse stored in the pulse width storage portion. The stop process-
(Continued)

ing portion stops control of a rotation speed of the drive motor performed by the speed control portion.

6 Claims, 5 Drawing Sheets

(51) Int. Cl.
*B65H 5/06* (2006.01)
*B65H 7/00* (2006.01)

(52) U.S. Cl.
CPC ...... *B65H 2557/23* (2013.01); *B65H 2557/33* (2013.01); *B65H 2801/06* (2013.01)

(56) References Cited

U.S. PATENT DOCUMENTS

2008/0111511 A1 5/2008 Kang et al.
2017/0108814 A1* 4/2017 Morimoto .............. B65H 5/062

* cited by examiner

MOTOR CONTROLLER, SHEET CONVEYING DEVICE, AND IMAGE FORMING APPARATUS

TECHNICAL FIELD

The present invention relates to a motor controller that controls a drive motor, a sheet conveying device including the motor controller, and an image forming apparatus including the sheet conveying device.

BACKGROUND ART

Conventionally, an image forming apparatus, such as a copying machine, a printer, a facsimile, or a multifunction peripheral, is provided with a plurality of rollers for conveying a sheet member on which an image is to be formed. These rollers are driven by a drive motor. As the drive motor, a servomotor such as a DC brushless motor may be used. There is known a configuration in which a DC brushless motor is used as a drive motor for driving a conveying roller that conveys sheets from a sheet feed cassette (see PTL 1).

Usually, an image forming apparatus that uses the servomotor as a drive source for the conveying roller is provided with a detector such as a rotary encoder for detecting the rotation speed and the like of the drive motor. In addition, a motor driver is electrically connected to the servomotor, and a controller such as a CPU is electrically connected to the motor driver. Then, the controller outputs, to the motor driver, a control signal representing a commanded speed to the servomotor. The motor driver generates a drive current by using a PWM (Pulse Width Modulation) method, on the basis of the commanded speed represented by the control signal and an actual rotation speed represented by a detection result from the detector, and supplies the drive current to the servomotor.

Meanwhile, as the control signal outputted from the controller to the motor driver, a pulse signal including a plurality of pulses each having a pulse width corresponding to the commanded speed to the servomotor is used. In this case, the motor driver detects the cycle of the pulse signal and the commanded speed, on the basis of a rising edge or a falling edge (hereinafter these edges are referred to as pulse edges) of the pulse signal.

CITATION LIST

Patent Literature

[PTL 1] Japanese Patent Laid-Open No. 2013-99056

SUMMARY OF THE INVENTION

Problems to be Solved by the Invention

In such a configuration, as the process performed by the controller in the case of stopping the rotation of the servomotor, a process for stopping the output of the pulse signal to the motor driver is conceivable. However, the motor driver cannot determine that becoming unable to detect the pulse edge is an instruction to stop the supply of the drive current to the servomotor. Therefore, it is not possible to cause the motor driver to stop the supply of the drive current by the controller merely stopping the output of the pulse signal to the motor driver.

It is also conceivable to configure the motor driver to determine that an instruction to stop the supply of the drive current to the servomotor is performed by the controller, provided that the motor driver is unable to detect the pulse edge in a predetermined waiting time. However, in order to stop the supply of the drive current, it is necessary to cause the motor driver to wait for the waiting time. Therefore, the timing at which the supply of the drive current is stopped is delayed from the timing at which the supply of the drive current should normally be stopped.

Such a problem will not arise in the case of a configuration in which the controller outputs, to the motor driver, a stop signal for instructing to stop the supply of the drive current, separately from the pulse signal. In this case, however, a signal line for the stop signal is additionally required, which may cause an increase in the size of the circuit board.

It is an object of the present invention to provide a motor controller, a sheet conveying device, and an image forming apparatus that can stop the supply of a drive current to a drive motor such as a servomotor at the timing at which the supply of the drive current to the drive motor should be stopped, while preventing an increase in the size of the circuit board.

Solution to the Problems

A motor controller according to one aspect of the present invention includes a pulse width detection portion, a speed control portion, a pulse width storage portion, a same pulse detection portion, and a stop processing portion. The pulse width detection portion is configured to, when a pulse signal including a plurality of pulses each having a pulse width corresponding to a commanded speed to a drive motor is inputted, detect the pulse widths of the pulses included in the pulse signal. The speed control portion is configured to perform: an acceleration control in which a rotation speed of the drive motor is accelerated from zero to a predetermined target rotation speed, on the basis of the pulse signal in which the pulse width is set such that the commanded speed gradually increases to the target rotation speed; and a deceleration control in which the rotation speed of the drive motor is decelerated to zero, on the basis of the pulse signal in which the pulse width is set such that the commanded speed gradually decreases from the target rotation speed with the same magnitude of acceleration as that in the acceleration control. The pulse width storage portion is configured to store the pulse width detected by the pulse width detection portion for an earliest pulse included in the pulse signal inputted during the acceleration control. The same pulse detection portion is configured to detect, from among the pulses included in the pulse signal inputted during the deceleration control, a pulse in which the pulse width detected by the pulse width detection portion is the same pulse width as the pulse width of the earliest pulse stored in the pulse width storage portion. The stop processing portion is configured to, when a pulse having the same pulse width as the pulse width of the earliest pulse is detected by the same pulse detection portion, stop control of the rotation speed of the drive motor performed by the speed control portion.

A sheet conveying device according to another aspect of the present invention includes the motor controller and a conveying roller. The conveying roller is configured to rotate by using a driving force transmitted from the drive motor controlled by the motor controller, to convey a sheet member.

An image forming apparatus according to still another aspect of the present invention includes the sheet conveying device and an image forming portion. The image forming portion is configured to form an image on the sheet member conveyed by the sheet conveying device.

Advantageous Effects of the Invention

According to the present invention, it is possible to provide a motor controller, a sheet conveying device, and an image forming apparatus that can stop the supply of a drive current to a drive motor at the timing at which the supply of the drive current to the drive motor should be stopped, while preventing an increase in the size of the circuit board.

Figure 5:
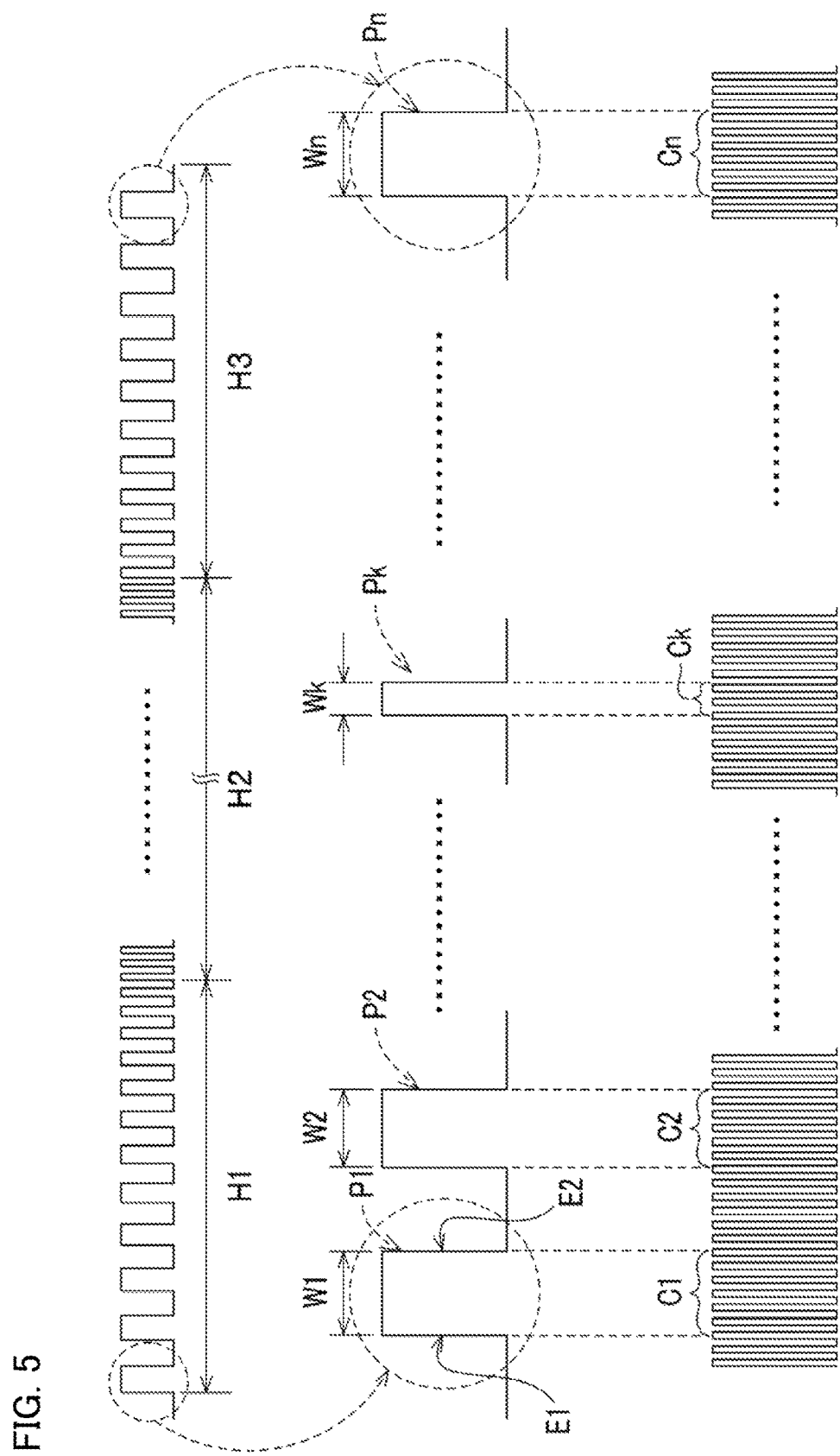

An upper-stage diagram of FIG. 5 shows a signal waveform of a pulse signal outputted from a control portion, a middle-stage diagram of FIG. 5 is an enlarged view of the signal waveform shown in the upper-stage diagram, and a lower-stage diagram of FIG. 5 is a signal waveform chart showing a reference clock signal for detecting the pulse width of a control pulse included in the pulse signal shown in the upper-stage diagram.

Figure 6:
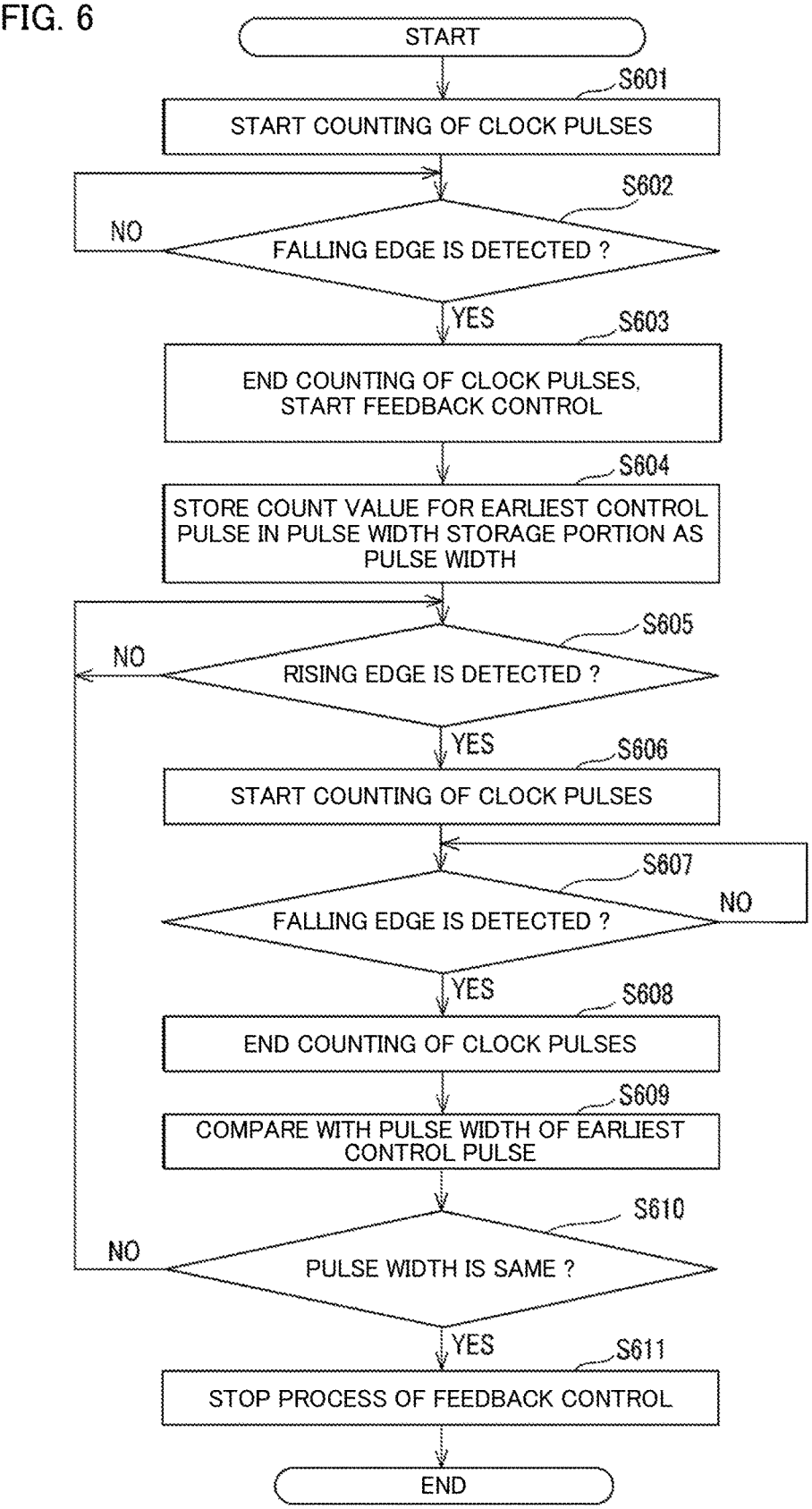

FIG. 6 is a flowchart showing a motor control process performed by a motor controller.

DESCRIPTION OF EMBODIMENT

Hereinafter, an embodiment of the present invention will be described with reference to the drawings. The embodiment described below is merely an example embodying the present invention, and not to be construed as limiting the technical scope of the present invention.

Figure 1:
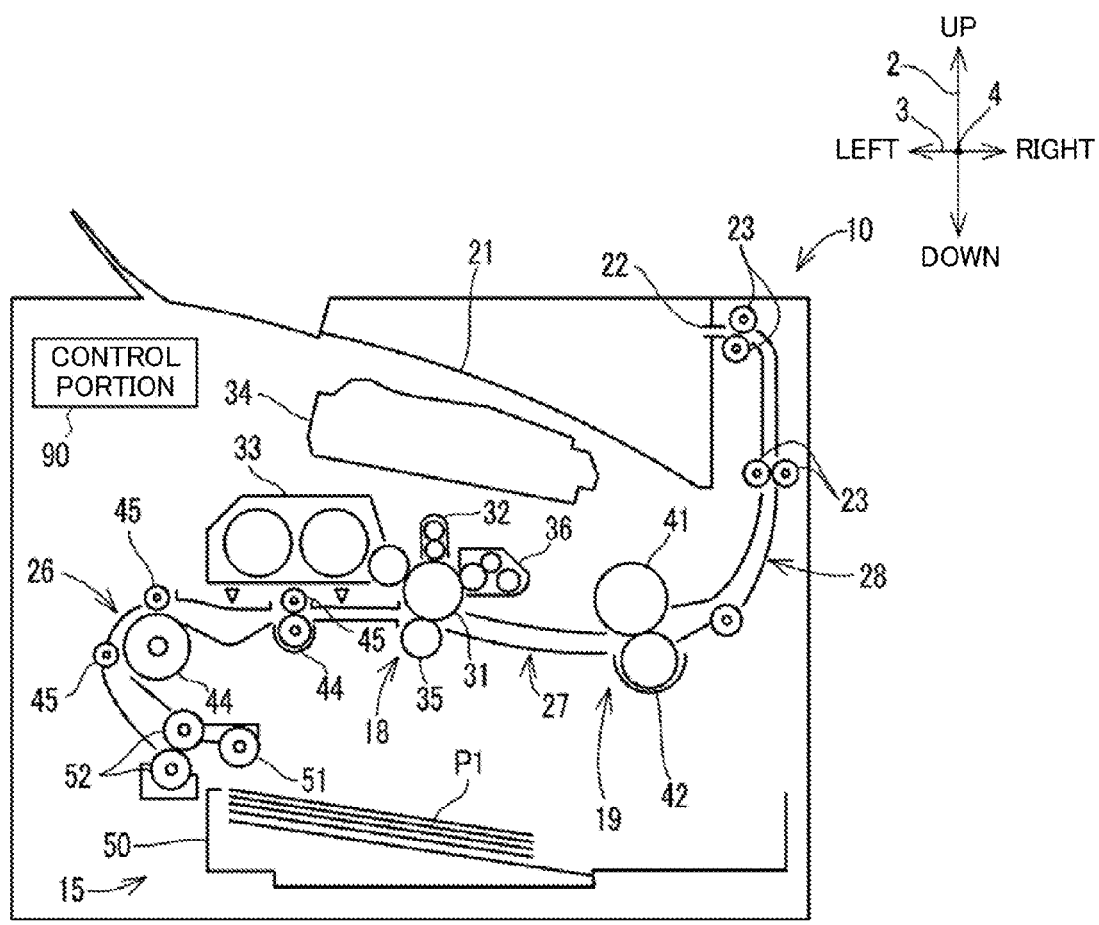
FIG. 1 is a diagram showing the configuration of an image forming apparatus according to an embodiment of the present invention.

FIG. 1 is a diagram showing the configuration of an image forming apparatus 10 according to an embodiment of the present invention. In the following description, an up-down direction 2, a right-left direction 3, and a front-rear direction 4, which are shown in FIG. 1, are sometimes used.

As shown in FIG. 1, the image forming apparatus 10 is a printer that prints an image on a sheet member P1 by using toner. The image forming apparatus 10 is not limited to the printer having only a print function. The present invention is also applicable to, for example, a facsimile, a copying machine, or a multifunction peripheral having various functions such as a print function, a copying function, and a facsimile function.

The image forming apparatus 10 prints an image on the sheet member P1 on the basis of image data inputted externally via a network communication portion which is not shown. The image forming apparatus 10 includes a sheet feed portion 15, an image forming portion 18, a fixing portion 19, a sheet discharge portion 21, a control portion 90, and a sheet conveying device 100 (see FIG. 2).

The sheet feed portion 15 includes a paper feed tray 50, a pick-up roller 51, and a sheet feed roller pair 52. In the paper feed tray 50, sheet members P1 on which an image is to be formed by the image forming portion 18 are stored. When an instruction to start an operation of feeding the sheet member P1 is inputted to the image forming apparatus 10, the sheet member P1 is fed from the paper feed tray 50 by the pick-up roller 51 and the sheet feed roller pair 52. The sheet member P1 fed by the pick-up roller 51 is conveyed by the sheet feed roller pair 52 to a first conveyance path 26 formed at the downstream side in the direction in which the sheet member P1 is fed.

The first conveyance path 26 is a conveyance path formed from the sheet feed roller pair 52 to the image forming portion 18, and is formed by conveyance guides (not shown) provided so as to be opposed to each other. A plurality of rotary rollers 44 are disposed on the first conveyance path 26. At the respective rotary rollers 44, rotary rollers 45 are disposed in a state of being in contact with the outer circumferential surfaces of the rotary rollers 44. When the rotary rollers 44 rotate, the rotary rollers 45 also rotate so as to follow this rotation. The sheet member P1 fed to the first conveyance path 26 by the sheet feed roller pair 52 is conveyed to the image forming portion 18 while being nipped between each rotary roller 44 and each rotary roller 45.

The image forming portion 18 is provided near the end of the first conveyance path 26. The image forming portion 18 is an electrophotographic type image forming portion that forms a toner image on the sheet member P1 on the basis of externally inputted image data. The image forming portion 18 includes a photosensitive drum 31, a charging portion 32, a developing portion 33, an exposure portion 34, a transfer portion 35, and a cleaning portion 36.

When an image forming operation is started, the surface of the photosensitive drum 31 is uniformly charged at a predetermined potential by the charging portion 32. In addition, the exposure portion 34 scans the charged photosensitive drum 31 with laser light in accordance with the image data. Accordingly, an electrostatic latent image is formed on the photosensitive drum 31. Thereafter, toner is attached to the electrostatic latent image by the developing portion 33, whereby a toner image is developed on the photosensitive drum 31. Then, the toner image is transferred by the transfer portion 35 onto the sheet member P1 that has been conveyed on the first conveyance path 26. The sheet member P1 on which the toner image has been formed is conveyed to a second conveyance path 27 formed at the downstream side with respect to the image forming portion 18 in the direction in which the sheet member P1 is conveyed.

The sheet member P1 sent out from the image forming portion 18 to the second conveyance path 27 is conveyed through the second conveyance path 27 to the fixing portion 19. The fixing portion 19 fixes the toner image transferred onto the sheet member P1, on the sheet member P1 by heat and pressure. The fixing portion 19 includes a heating roller 41 and a pressure roller 42. At the fixing portion 19, the toner is heated and melted by the heating roller 41 to be fixed on the sheet member P1. The sheet member P1 on which the image has been fixed by the fixing portion 19 is conveyed to a third conveyance path 28 formed at the downstream side with respect to the fixing portion 19 in the direction in which the sheet member P1 is conveyed.

On the third conveyance path 28, a plurality of sheet discharging roller pairs 23 are provided. The sheet member P1 sent out to the third conveyance path 28 is conveyed upward through the third conveyance path 28 by the sheet discharging roller pairs 23, and is discharged through a paper sheet discharge port 22 to the sheet discharge portion 21 provided on an upper surface of the image forming apparatus 10.

As described above, the pick-up roller 51, the sheet feed roller pair 52, the rotary rollers 44, the heating roller 41, the pressure roller 42, and the sheet discharging roller pairs 23 rotate, thereby to convey the sheet member P1. In the following description, these rollers are collectively referred to as conveying roller 150 (see FIG. 2).

Figure 2:
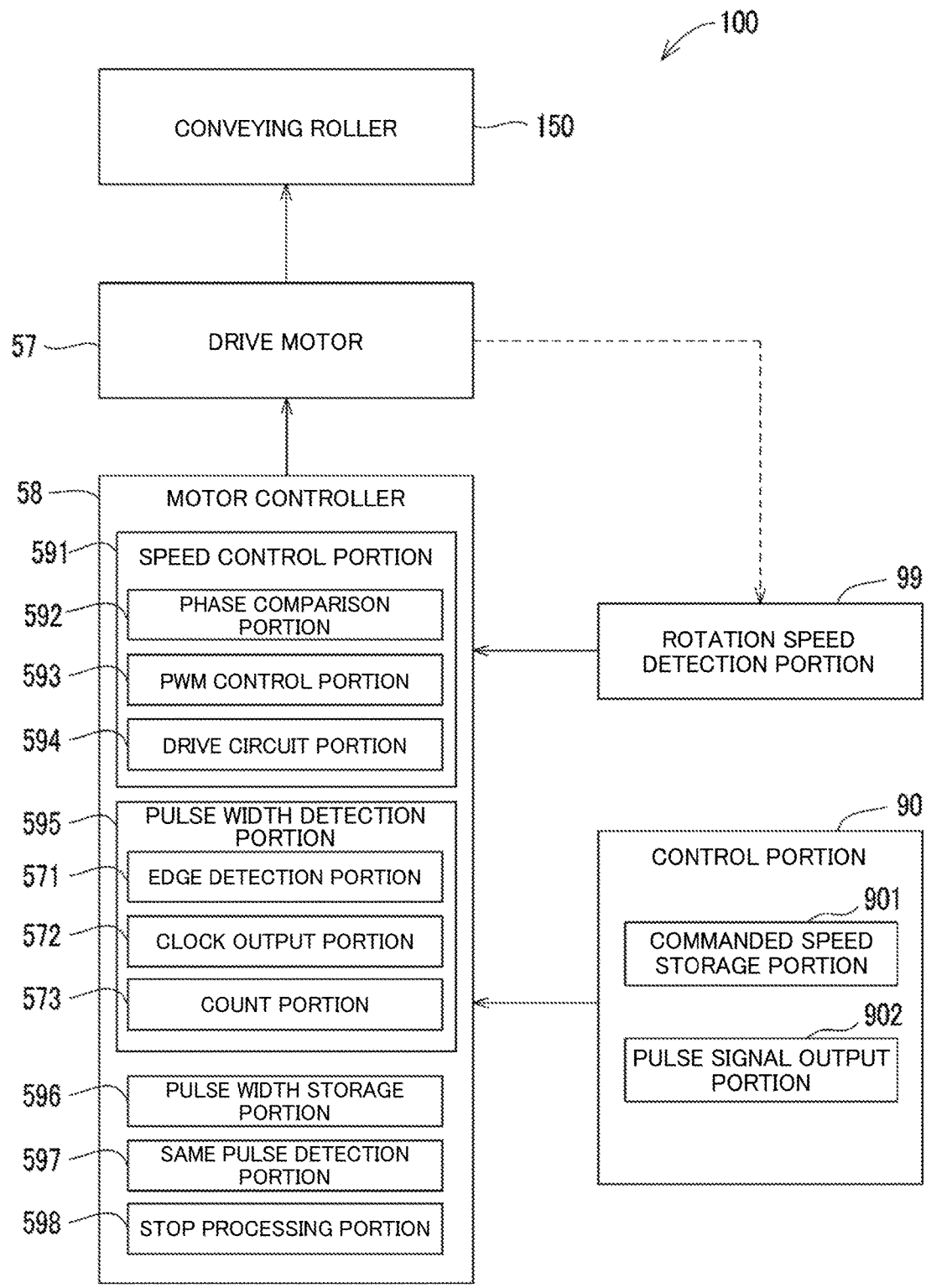
FIG. 2 is a block diagram showing the configuration of a sheet conveying device provided in the image forming apparatus according to the embodiment of the present invention.

As shown in FIG. 2, the conveying roller 150 is rotationally driven by a driving force generated by a drive motor 57 and transmitted via a drive transmission mechanism, such as a gear, which is not shown. The drive motor 57 is a servomotor such as a DC brushless motor. In the present embodiment, as the drive motor 57, an inner rotor type DC brushless motor is used in which a plurality of electromagnets are provided in a yoke and a rotor connected to a motor output shaft 48 (see FIG. 3) is provided inside the yoke. In addition, when three-phase drive currents having different phases are supplied to the electromagnets, the rotor is rotated, and the conveying roller 150 is rotated via the motor output shaft 48 connected to the rotor. The drive motor 57 is not limited to the DC brushless motor as long as the drive motor 57 is a servomotor of which feedback control of a rotation speed or the like is performed on the basis of a speed signal representing an actual rotation speed of the drive motor 57, detected by a rotation speed detection portion 99 (see FIG. 3) described later.

The image forming apparatus 10 includes the rotation speed detection portion 99 that detects an actual rotation speed of the drive motor 57. The rotation speed detection portion 99 in the present embodiment is a rotary encoder.

Figure 3:
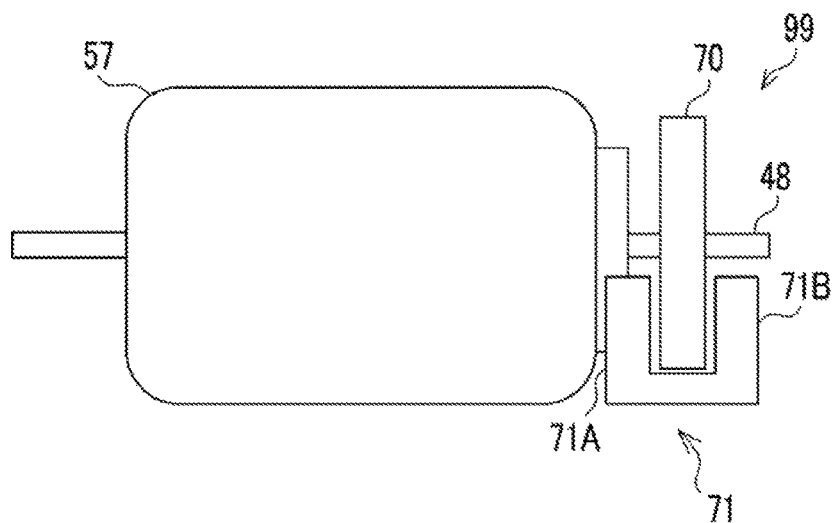
FIG. 3 is a diagram showing the configuration of a drive motor and a rotation speed detection portion.

As shown in FIG. 3, the rotation speed detection portion 99 includes a pulse plate 70 having a disc shape and a photointerrupter 71. The pulse plate 70 has a large number of slits (not shown) extending in a radial direction and formed so as to be arranged radially, for example, at intervals of a rotation angle of 1°. The pulse plate 70 is fixed to the motor output shaft 48 of the drive motor 57.

The photointerrupter 71 includes a light-emitting portion 71A and a light-receiving portion 71B that are opposed to each other at a certain interval. The pulse plate 70 passes through the gap between the light-emitting portion 71A and the light-receiving portion 71B. The signal level of a signal outputted from the light-receiving portion 71B is different between when light outputted from the light-emitting portion 71A passes through the slit and is received by the light-receiving portion 71B and when the light outputted from the light-emitting portion 71A is shielded by a portion of the pulse plate 70 other than the slits. Accordingly, when the pulse plate 70 rotates, a pulse signal is outputted from the light-receiving portion 71B. The pulse signal outputted from the light-receiving portion 71B is outputted to the motor controller 58 as the speed signal of the rotation speed detection portion 99. In the case where a large number of slits (not shown) extending in the radial direction are formed so as to be arranged radially, for example, at intervals of a rotation angle of 1° as described above, the rotary encoder is able to detect the rotation speed of the pulse plate 70 with detection accuracy of a rotation angle of 1°.

As shown in FIG. 2, the sheet conveying device 100 includes a motor controller 58 and the conveying roller 150. The motor controller 58 is electrically connected to the drive motor 57 and the control portion 90. The motor controller 58 receives a speed command from the control portion 90 and controls a drive current to be supplied to the drive motor 57. The conveying roller 150 rotates by using the driving force, which is transmitted from the drive motor 57 controlled by the motor controller 58, to convey the sheet member P1.

The motor controller 58 includes an electronic circuit such as an integrated circuit (ASIC), and an internal memory, and so forth. The motor controller 58 may be a microcomputer including a CPU and the like, as with the control portion 90.

The motor controller 58 serves as a speed control portion 591. The speed control portion 591 executes a feedback control in which the above drive current is generated by a PWM method (pulse width modulation method), using a pulse signal, which will be described later, inputted from the control portion 90 and the speed signal outputted from the rotation speed detection portion 99, and is supplied to the drive motor 57. The pulse signal is a control signal representing a commanded speed to the drive motor 57. The commanded speed will be described later.

The speed control portion 591 includes a phase comparison portion 592, a PWM control portion 593, and a drive circuit portion 594.

The phase comparison portion 592 performs, for example, a known PID (Proportional-Integral-Derivative) control on the basis of the phase difference between the pulse signal inputted from the control portion 90 and the speed signal inputted from the rotation speed detection portion 99.

The PWM control portion 593 generates a PWM signal having a duty ratio corresponding to a control variable obtained through the PID control performed by the phase comparison portion 592.

The drive circuit portion 594 applies, to the drive motor 57, a voltage that is proportional to the duty ratio of the PWM signal outputted from the PWM control portion 593 and supplies the drive current to the drive motor 57.

The control portion 90 is a microcomputer in which, for example, a CPU, a ROM, and a RAM, etc., are embedded in one integrated circuit. The CPU is a processor that executes various calculation processes. The ROM is a non-volatile storage portion in which information such as a control program for causing the CPU to execute various processes is stored in advance. The RAM is a volatile storage portion that is used as a primary storage memory (working area) for the various processes executed by the CPU. The control portion 90 centrally controls operation of the image forming apparatus 10 by the CPU executing programs stored in the ROM.

A processing program for causing the CPU to execute various processes is stored in the ROM of the control portion 90. The control portion 90 serves as a pulse signal output portion 902 by executing the program with the CPU. The ROM of the control portion 90 includes a commanded speed storage portion 901.

A so-called trapezoidal control is performed on the rotation speed of the drive motor 57 by the motor controller 58. That is, a period in which the rotation speed of the drive motor 57 is controlled includes an acceleration control period H1, a constant speed control period H2, and a deceleration control period H3 (see FIG. 4). In the acceleration control period H1, the rotation speed of the drive motor 57 is gradually increased from a speed of zero to a predetermined target rotation speed. Accordingly, the conveying roller 150 accelerates to a predetermined conveyance speed at which the sheet member P1 is conveyed at the predetermined conveyance speed. In the constant speed control period H2 after the acceleration control period H1, the rotation speed of the drive motor 57 is maintained at the target rotation speed. Accordingly, the conveying roller 150 is maintained in a state where the conveying roller 150 conveys the sheet member P1 at the conveyance speed. Thereafter, in the deceleration control period H3, the rotation speed of the drive motor 57 is gradually decreased from the target rotation speed to a speed of zero. Accordingly, the conveying roller 150 decelerates from the conveyance speed and stops.

In order to allow the motor controller 58 to perform such a control on the rotation speed of the drive motor 57, a rotation speed of the drive motor 57 is commanded to the motor controller 58 from the control portion 90 in each of the periods H1 to H3.

Figure 4:
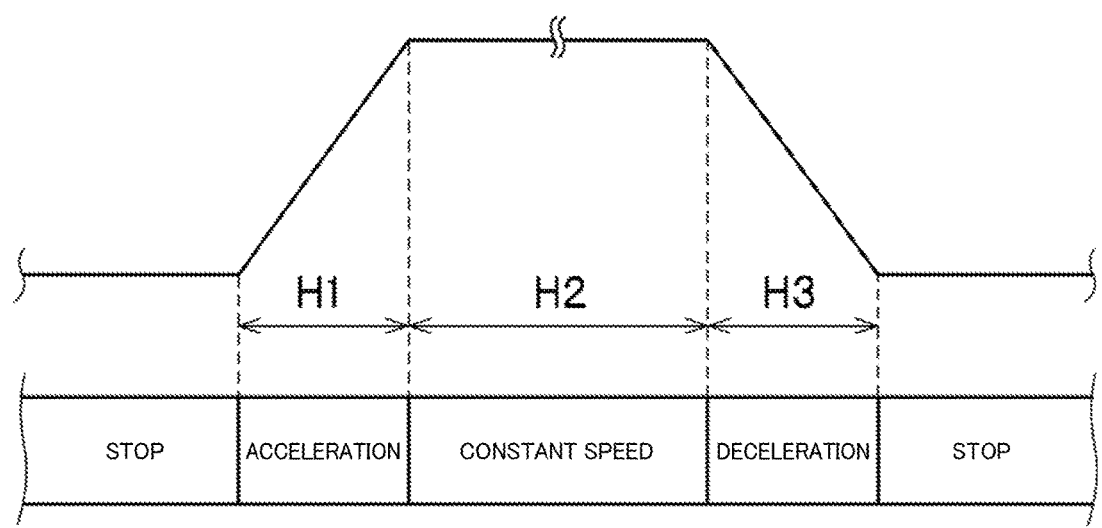
FIG. 4 is a graph showing change of a commanded speed to the drive motor.

Here, as shown in FIG. 4, in the acceleration control period H1, a rotation speed is commanded from the control portion 90 to the motor controller 58 for a plurality of times such that the rotation speed of the drive motor 57 gradually increases until the rotation speed of the drive motor 57 reaches the target rotation speed. That is, the commanded speed from the control portion 90 to the motor controller 58 increases in a stepwise manner. In the constant speed control period H2, the motor controller 58 is repeatedly commanded from the control portion 90 to rotate the drive motor 57 at a constant rotation speed. In the deceleration control period H3, a rotation speed is repeatedly commanded from the control portion 90 to the motor controller 58 such that the rotation speed of the drive motor 57 gradually decreases until the rotation speed of the drive motor 57 becomes a speed of zero. That is, the commanded speed from the control portion 90 to the motor controller 58 decreases in a stepwise manner.

A command of the rotation speed of the drive motor 57 from the control portion 90 to the motor controller 58 is performed using the pulse signal outputted from the pulse signal output portion 902 to the motor controller 58. The pulse signal is a rectangular wave signal. In the present specification, one rectangular wave, i.e., a HIGH level signal, which is a waveform portion from a rising edge E1 (see a middle-stage diagram of FIG. 5) to a subsequent falling edge E2 (see the middle-stage diagram of FIG. 5) is referred to as a control pulse, and the pulse signal refers to a pulse signal including a plurality of the control pulses. The control pulse corresponds to the pulse of the present invention.

In the present embodiment, the duty ratio of the pulse signal has a predetermined constant value, regardless of the magnitude of the commanded speed. The commanded speed is commanded using the cycle of the pulse signal, or in other words, the pulse width of the control pulse. For example, as shown in an upper-stage diagram of FIG. 5, the pulse signal outputted from the pulse signal output portion 902 in the acceleration control period H1 in which the commanded speed increases in a stepwise manner is a signal for accelerating the rotation speed of the drive motor 57 as described above. The cycle of the pulse signal and the pulse width of the control pulse gradually shorten. That is, the pulse signal in the acceleration control period H1 is a rectangular wave signal having a plurality of control pulses in which the pulse width gradually decreases from a speed of zero to the target rotation speed. The pulse width of each of the control pulses of the pulse signal in the acceleration control period H1 represents the commanded speed, i.e., the rotation speed at which the drive motor 57 should rotate after an elapse of one cycle. In the present embodiment, the pulse width gradually decreases in the acceleration control period H1, indicating that the rotation speed at which the drive motor 57 should rotate after an elapse of one cycle is faster than the rotation speed represented by the pulse width of the immediately previous control pulse.

The pulse signal outputted from the pulse signal output portion 902 in the deceleration control period H3 in which the commanded speed decreases in a stepwise manner is a signal for decelerating the rotation speed of the drive motor 57 as described above. The cycle of the pulse signal and the pulse width of the control pulse gradually lengthen. That is, the pulse signal in the deceleration control period H3 is a rectangular wave signal having a plurality of control pulses in which the pulse width gradually increases from the target rotation speed to a speed of zero. The pulse width of each of the control pulses of the pulse signal in the deceleration control period H3 represents the commanded speed, i.e., the rotation speed at which the drive motor 57 should rotate after an elapse of one cycle. In the present embodiment, the pulse width gradually increases in the deceleration control period H3, indicating that the rotation speed at which the drive motor 57 should rotate after an elapse of one cycle is slower than the rotation speed represented by the pulse width of the immediately previous control pulse.

The pulse signal outputted from the pulse signal output portion 902 in the constant speed control period H2 in which the commanded speed is constant is a signal for maintaining the rotation speed of the drive motor 57 at the target rotation speed, and the cycle of the pulse signal and the pulse width of the control pulse do not change. That is, the pulse signal in the constant speed control period H2 is a rectangular wave signal including a plurality of control pulses having the same pulse width.

In this manner, the pulse width of the control pulse corresponds to the commanded speed. In the commanded speed storage portion 901, the pulse widths of the control pulses in the periods H1 to H3 are stored in advance as the information on the commanded speeds to the drive motor 57 in the periods H1 to H3. Then, the pulse signal output portion 902 generates the pulse signal on the basis of information on the commanded speeds stored in the commanded speed storage portion 901, and outputs the pulse signal to the motor controller 58. Accordingly, the speed control portion 591 of the motor controller 58 performs the acceleration control, the constant speed control, and the deceleration control.

Here, the magnitude of the absolute value of acceleration in the deceleration control period H3 is the same as the magnitude of the absolute value of acceleration in the acceleration control period H1. Therefore, in the deceleration control period H3, the pulse signal output portion 902 decreases the commanded speed from the target rotation speed to zero in the same time period as the time period in which the commanded speed is increased from zero to the target rotation speed in the acceleration control period H1.

In this case, in the deceleration control period H3, the pulse signal output portion 902 outputs the control pulses having the same pulse widths as the control pulses included in the pulse signal outputted in the acceleration control period H1, in the reverse order from the order in the acceleration control period H1. Therefore, the pulse width in the pulse signal in the acceleration control period H1 gradually decreases with a gradual increase in the commanded speed, and the pulse width in the pulse signal in the deceleration control period H3 gradually increases with a gradual decrease in the commanded speed. The pulse width of the control pulse outputted last by the pulse signal output portion 902 in the deceleration control period H3 has the same pulse width as the pulse width of the control pulse outputted first by the pulse signal output portion 902 in the acceleration control period H1. Having the same pulse width encompasses not only a case where the pulse width is completely matching, but also a case where the pulse width falls within a predetermined error range.

The process executed by the pulse signal output portion 902 of the control portion 90 in the case of stopping the rotation of the drive motor 57 includes a process for stopping the output of the pulse signal to the motor controller 58. However, the motor controller 58 cannot determine that becoming unable to detect the pulse edge of the control pulse is an instruction to stop the supply of the drive current to the drive motor 57. Therefore, it is not possible to cause the motor controller 58 to stop the supply of the drive current by the pulse signal output portion 902 merely stopping the output of the pulse signal to the motor controller 58.

The motor controller 58 may be configured to determine that an instruction to stop the supply of the drive current to the drive motor 57 is performed by the pulse signal output portion 902, provided that the motor controller 58 is unable to detect the pulse edge in a predetermined waiting time. However, in order to stop the supply of the drive current, it is necessary to cause the motor controller 58 to wait for the waiting time. Therefore, the timing at which the supply of the drive current is stopped is delayed from the timing at which the supply should normally be stopped.

Such a problem will not arise with a configuration in which the pulse signal output portion 902 outputs a stop signal for instructing to stop the supply of the drive current to the motor controller 58, separately from the pulse signal. However, a signal line for the stop signal is additionally required, which may cause an increase in the size of the circuit board. In contrast, in the present embodiment, the following configuration is adopted to provide the measures for stopping the supply of the drive current to the drive motor 57 at the timing at which the supply should be stopped, while preventing an increase in the size of the circuit board.

As shown in FIG. 2, the motor controller 58 includes a pulse width detection portion 595, a pulse width storage portion 596, a same pulse detection portion 597, and a stop processing portion 598.

The pulse width detection portion 595 detects the pulse widths of the control pulses included in the pulse signal inputted from the control portion 90. The pulse width detection portion 595 includes an edge detection portion 571, a clock output portion 572, and a count portion 573. Hereinafter, the kth (k=1, 2, . . . ; and so on) outputted control pulse since the start of the drive control of the drive motor 57 is expressed as Pk. The pulse width of the control pulse Pk is expressed as Wk.

The edge detection portion 571 detects a rising edge E1 and a falling edge E2 of the control pulse Pk. As shown in a lower-stage diagram of FIG. 5, the clock output portion 572 outputs a reference clock signal having a shorter cycle than that of the control pulse Pk. Here, the reference clock signal is a high-frequency (e.g., 10 MHz) rectangular wave signal generated by a crystal oscillator, which is not shown. Hereinafter, of the reference clock signal, a waveform portion from the rising edge to the subsequent falling edge, i.e., a HIGH level signal, is referred to as a clock pulse. The count portion 573 counts the number of clock pulses included in the reference clock signal outputted from the clock output portion 572 between the detection of the rising edge E1 of the control pulse and the detection of the falling edge E2 thereof by the edge detection portion 571. The number of the clock pulses included in the reference clock signal is the same as the number of, for example, the rising edges of the clock pulses, and therefore, the count portion 573 counts the number of the rising edges of the clock pulses as the number of the clock pulses.

The count value Ck obtained by the count portion 573 is a value corresponding to the pulse width Wk of the control pulse Pk. The pulse width detection portion 595 detects the count value Ck obtained by the count portion 573 as the pulse width Wk of the control pulse Pk.

The pulse width detection portion 595 stores, in the pulse width storage portion 596, a count value C1 for a control pulse P1 that is inputted first in the acceleration control period H1 as a pulse width W1 of the control pulse P1.

The same pulse detection portion 597 determines whether the pulse width detected by the pulse width detection portion 595 for a control pulse Pk (k=2, 3, . . . ) that is inputted after the earliest control pulse P1 is the same pulse width as the pulse width W1 of the earliest control pulse P1. By performing this determination, the same pulse detection portion 597 detects, from among the control pulses that are inputted after the earliest control pulse P1, a control pulse Pn (see the middle-stage diagram of FIG. 5) having the same pulse width as the pulse width W1 of the earliest control pulse P1.

When the control pulse Pn having the same pulse width as the pulse width W1 of the earliest control pulse P1 is detected by the same pulse detection portion 597, the stop processing portion 598 stops the control of the rotation speed of the drive motor 57 performed by the speed control portion 591.

Next, a motor control process executed by the motor controller 58 will be described with reference to FIG. 6. The following process is executed when the rising edge E1 of the earliest control pulse P1 is detected by the edge detection portion 571 in a state where the drive motor 57 is stopped. In the flowchart in FIG. 6, S601, S602, . . . represent a process procedure (step numbers).

<Step S601>

When the rising edge E1 of the earliest control pulse P1 is detected by the edge detection portion 571, the count portion 573 starts the counting of the clock pulses included in the reference clock signal.

<Step S602>

The edge detection portion 571 determines whether the falling edge E2 of the earliest control pulse P1 is detected. If the edge detection portion 571 determines that the falling edge E2 of the earliest control pulse P1 is not detected (NO in step S602), the edge detection portion 571 executes the process in step S602 again. On the other hand, if the edge detection portion 571 determines that the falling edge E2 of the earliest control pulse P1 is detected (YES in step S602), the process in step S603 is executed.

<Step S603>

The count portion 573 ends the counting of the clock pulses included in the reference clock signal. The speed control portion 591 starts execution of a feedback control in which the drive current is generated by a PWM method (pulse width modulation method), using the pulse signal inputted from the control portion 90 and the speed signal inputted from the rotation speed detection portion 99, and is supplied to the drive motor 57.

<Step S604>

The pulse width detection portion 595 stores the count value C1 obtained by the count portion 573 in the pulse width storage portion 596 as the pulse width W1 of the earliest control pulse P1.

<Step S605>

The edge detection portion 571 determines whether the rising edge E1 is detected for a control pulse subsequent to the earliest control pulse P1. If the edge detection portion 571 determines that the rising edge E1 of the control pulse is not detected (NO in step S605), the edge detection portion 571 executes the process in step S605 again. On the other hand, if the edge detection portion 571 determines that the rising edge E1 for the control pulse is detected (YES in step S605), the process in step S606 is executed.

<Step S606>

The count portion 573 starts the counting of the clock pulses included in the reference clock signal.

<Step S607>

The edge detection portion 571 determines whether the falling edge E2 of the control pulse is detected. If the edge detection portion 571 determines that the falling edge E2 of the control pulse is not detected (NO in step S607), the edge detection portion 571 executes the process in step S607 again. On the other hand, if the edge detection portion 571 determines that the falling edge E2 of the control pulse is detected (YES in step S607), the count portion 573 executes the process in step S608.

<Step S608>

The count portion 573 ends the counting of the clock pulses included in the reference clock signal. Accordingly, the pulse width of the control pulse is detected by the pulse width detection portion 595.

<Step S609>

The same pulse detection portion 597 compares the pulse width detected in step S608 with the pulse width W1 of the earliest control pulse P1 stored in the pulse width storage portion 596.

<Step S610>

If the same pulse detection portion 597 determines that the pulse width detected in step S608 is not the same pulse width as the pulse width W1 of the earliest control pulse P1 (NO in step S610), the procedure returns to the process in step S605. On the other hand, if the same pulse detection portion 597 determines that the pulse width detected in step S608 is the same as the pulse width W1 (YES in step S610), the motor controller 58 executes the process in step S611.

<Step S611>

The stop processing portion 598 stops the feedback control performed by the speed control portion 591.

As described above, when the control pulse having the same pulse width as the pulse width W1 of the earliest control pulse P1, which is inputted first to the motor controller 58 in the acceleration control period H1, is inputted to the motor controller 58, the speed control of the drive motor 57 is stopped. Unlike a configuration in which the control portion 90 outputs a stop signal for instructing to stop the supply of the drive current to the motor controller 58 separately from the pulse signal, no additional signal line for the stop signal is required, so that the size of the circuit board will not be increased.

Thus, it is possible to stop the supply of the drive current to the drive motor 57 at the timing at which the supply of the drive current to the drive motor 57 should be stopped, while preventing an increase in the size of the circuit board.

The invention claimed is:

1. A motor controller comprising:
a pulse width detection portion configured to, when a pulse signal including a plurality of pulses each having a pulse width corresponding to a commanded speed to a drive motor is inputted, detect the pulse widths of the pulses included in the pulse signal;
a speed control portion configured to perform: an acceleration control in which a rotation speed of the drive motor is accelerated from zero to a predetermined target rotation speed, on the basis of the pulse signal in which the pulse width is set such that the commanded speed gradually increases to the target rotation speed; and a deceleration control in which the rotation speed of the drive motor is decelerated to zero, on the basis of the pulse signal in which the pulse width is set such that the commanded speed gradually decreases from the target rotation speed with the same magnitude of acceleration as that in the acceleration control;
a pulse width storage portion configured to store the pulse width detected by the pulse width detection portion for an earliest pulse included in the pulse signal inputted during the acceleration control;
a same pulse detection portion configured to detect, from among the pulses included in the pulse signal inputted during the deceleration control, a pulse in which the pulse width detected by the pulse width detection portion is the same pulse width as the pulse width of the earliest pulse stored in the pulse width storage portion; and
a stop processing portion configured to, when a pulse having the same pulse width as the pulse width of the earliest pulse is detected by the same pulse detection portion, stop control of the rotation speed of the drive motor performed by the speed control portion.

2. The motor controller according to claim 1, wherein the pulse width in the pulse signal during the acceleration control gradually decreases with a gradual increase in the commanded speed, and the pulse width in the pulse signal during the deceleration control gradually increases with a gradual decrease in the commanded speed.

3. The motor controller according to claim 1, wherein the pulse signal has a constant duty ratio.

4. The motor controller according to claim 1, wherein the speed control portion executes a feedback control of a drive current supplied to the drive motor, by using the pulse signal and a speed signal representing an actual rotation speed of the drive motor.

5. A sheet conveying device comprising:
the motor controller according to claim 1; and
a conveying roller configured to rotate by using a driving force transmitted from the drive motor controlled by the motor controller, to convey a sheet member.

6. An image forming apparatus comprising:
the sheet conveying device according to claim 5; and
an image forming portion configured to form an image on the sheet member conveyed by the sheet conveying device.

* * * * *